US007158476B2

(12) United States Patent
Kim

(10) Patent No.: US 7,158,476 B2
(45) Date of Patent: Jan. 2, 2007

(54) OFDM RECEIVER USING POLAR COORDINATE SYSTEM AND METHOD THEREOF

(75) Inventor: Dong-kyu Kim, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 1065 days.

(21) Appl. No.: 10/206,864

(22) Filed: Jul. 29, 2002

(65) Prior Publication Data

US 2003/0063558 A1    Apr. 3, 2003

(30) Foreign Application Priority Data

Jul. 27, 2001    (KR) ............... 2001-45293

(51) Int. Cl.
*H04J 11/00* (2006.01)
(52) U.S. Cl. ..................... 370/208; 370/210
(58) Field of Classification Search ........... 370/203, 370/208, 210; 375/136, 316
See application file for complete search history.

(56) References Cited

U.S. PATENT DOCUMENTS

| 4,179,586 A | 12/1979 | Mathews, Jr. et al. |
| 6,654,340 B1 * | 11/2003 | Jones et al. ............ 370/208 |
| 2002/0196734 A1 * | 12/2002 | Tanaka et al. ........... 370/210 |

FOREIGN PATENT DOCUMENTS

| EP | 0 938 216 A2 | 8/1999 |
| JP | 1-128609 A | 5/1999 |
| JP | 2000-295195 A | 10/2000 |
| JP | 2001-36386 A | 2/2001 |
| WO | WO 01/11844 A1 | 2/2001 |
| WO | WO 01/24410 A1 | 4/2001 |

OTHER PUBLICATIONS

Van de Beek J.J. et al, "Three Non-pilot Based Time-and Frequency Estimators for OFDM", Signal Processing, Amsterdam, NL, vol. 80, No. 7, Jul. 2000, pp. 1321-1334.
Schmidl T. M. et al. "Blind Synchronisation 1-23 for OFDM", Electronics Letters, IEE Stevenage, GB vol. 33, No. 2, Jan. 16, 1997, pp. 113-114.

* cited by examiner

*Primary Examiner*—Brenda Pham
(74) *Attorney, Agent, or Firm*—Sughrue Mion, PLLC

(57) ABSTRACT

A received signal is converted into a digital signal through an A/D converter and then converted into the polar coordinate system. A synchronizer removes a frequency offset from the digital signal, the digital signal is again converted into an orthogonal coordinate system and a fast fourier transform is performed with a FFT. The digital signal is again converted into the polar coordinate system. An equalizer and a phase compensator compensate respectively a channel distortion and a phase error to the digital signal. Thus, the OFDM receiver using polar coordinate system and method thereof of the present invention can reduce the number of adders and multipliers required in a frequency synchronization, a compensation for channel influence, and a removal of remaining phase error by processing the signal in the polar coordinate system, thereby simplifying the calculation process and the receiver.

23 Claims, 8 Drawing Sheets

OFDM RECEIVER USING POLAR COORDINATE SYSTEM AND METHOD THEREOF

BACKGROUND OF THE INVENTION

1. Field of the Invention

The present invention relates to an OFDM receiver using a polar coordinate system and method thereof, and more particularly to an OFDM receiver using a polar coordinate system and method thereof, which can simplify a calculation process therein. The present application is based on Korean Patent Application No. 2001-45293, which is incorporated herein by reference.

2. Description of the Related Art

An orthogonal frequency division multiplexing (OFDM) method is a method that increases efficiency in frequency use by using a plurality of carriers having mutual orthogonal properties. The OFDM method, which uses multi-carriers in a wire or wireless channel, is adapted to use in a high-speed data transmission.

For example, in the wireless telecommunication channel having multi-path fading, when data having short symbol periods are transmitted at a high speed by a single carrier method, the interference between symbols is intensified and thereby the complicacy at the receiving end is increased. However, when the multi-carrier method is used, the symbol period at respective sub-carriers can be extended by as many as the number of the sub-carriers while the data transmission speed is maintained as high as ever. Therefore, a simple equalizer having one tap can process even the deep frequency selective fading by multi-paths.

FIG. 1 is a block diagram for illustrating a composition of conventional OFDM receiver 100.

Referring to FIG. 1, a received complex analog signal is converted into a digital signal at an analog-to digital (A/D) converter 110. The digital signal passed through the A/D converter 110 is multiplied by a correcting signal corresponding to estimated frequency offset to compensate a carrier wave frequency offset, at a synchronizer 120. To minimize an interference with other signals, a guard interval remover 130 removes a predetermined guard interval or band from the digital signal in which the frequency offset is compensated. After the guard interval is removed, the digital signal is input into a fast fourier transformer (FFT) 140. The FFT 140 carries out a fourier transform to the input digital signal. An equalizer 150 compensates a channel distortion to the digital signal outputted from the FFT 140. After compensating the channel distortion, a phase compensator 160 compensates a phase error remaining in the digital signal. Thereafter, a demapper 170 converts the digital signal into the most approximate value among constellations, which are used in the conventional receiver 100.

In FIG. 1, the received complex signal comprises an inphase (I) signal corresponding to a real number portion and a quadrature (Q) signal corresponding to an imaginary number portion, which are designated as solid lines, respectively. The complex signal has an orthogonal coordinate system until it is input into the demapper 170.

FIG. 2 is a block diagram for illustrating a composition of the synchronizer 120 using orthogonal coordinates, which is applied to the conventional OFDM receiver 100.

Referring to FIG. 2, the synchronizer 120 estimates a frequency offset by using estimation signals, and then outputs the estimated result as a complex value. The outputted complex value is converted into a phase through an arctangent function. The converted phase is converted into a trigonometric function, and multiplied by the received complex signal. Thus, a frequency offset is removed from the received complex signal by the synchronizer 120.

FIG. 3 is a block diagram for illustrating a composition of the equalizer 150 using the orthogonal coordinates, which is applied to the conventional OFDM receiver 100.

Referring to FIG. 3, the equalizer 150 receives estimation signals to estimate a channel distortion and multiplies a received complex signal by an estimated result to remove a distortion component in the channel.

FIG. 4 is a block diagram for illustrating a composition of the phase compensator 160 using the orthogonal coordinates, which is applied to the conventional OFDM receiver 100.

Referring to FIG. 4, a composition of the phase compensator 160 is similar to that of the synchronizer 120. That is, the phase compensator 160 estimates a phase error remaining in the received complex signal by using estimation signals, and outputs the estimated result as a complex value. The outputted complex value is converted into a phase through an arctangent function. The converted phase is converted into a trigonometric function, and then multiplied by the received complex signal. Thus, the phase error remaining in the received complex signal is compensated by the phase compensator 160.

To convert the phase of the complex signal, calculators for arctangent, sine and cosine functions are required to be disposed in the synchronizer 120, the equalizer 150, and the phase compensator 160. Particularly, estimators of components for transforming the phase such as the synchronizer 120, the equalizer 150 and the phase compensator 160 have a structure as described below.

First, a basic operation of each component is to estimate a value to be estimated by using a difference in phase between two input complex signals. Accordingly, to obtain the difference in phase between the two input complex signals input in the orthogonal coordinate system, it is necessary to use a conjugate complex multiplication according to the following mathematical expression 1.

$$X^*Y=(X_r+jX_i)^*(Y_r+jY_i)=(X_r-jX_i)(Y_r+jY_i)=(X_rY_r+X_iY_i)+j(X_rY_i-X_iY_r)$$ [Mathematical Expression 1]

A phase, which is finally estimated according to the difference in phase obtained by the mathematical expression 1, can be obtained by the following mathematical expression 2.

$$\theta=\tan^{-1}(Im[X^*Y]/Re[X^*Y])=\tan^{-1}[(X_rY_i-X_iY_r)/(X_rY_r+X_iY_i)]$$ [Mathematical Expression 2]

Accordingly, a phase of the complex signal can be compensated by multiplying the complex signal to be compensated by an estimated phase obtained by the mathematical expression 2, according to the following mathematical expression 3.

$$Ze^{-j\theta}=(Z_r+jZ_1)(\cos\theta-j\sin\theta)=(Z_r\cos\theta+Z_1\sin\theta)+j(Z_1\cos\theta-Z_r\sin\theta)$$ [Mathematical Expression 3]

In the mathematical expression 1 and 2, the sign * means a conjugate complex multiplication.

Accordingly, as described with reference to FIGS. 1 through 4, it can be appreciated that in the conventional OFDM receiver, the complex multiplication is carried out two times at respective estimators in three components, so that the total complex multiplication for estimation and compensation is carried out six times.

Thus, since the conventional OFDM receiver processes the received signal in the orthogonal coordinate system, a system structure for the frequency synchronization, the compensation for channel influence, and the removal of remaining phase error as well as a calculation process therefor becomes complicated. As the system structure and the calculation process are complicated, the process time required in the frequency synchronization, the compensation for the channel influence, and the removal of remaining phase error is also lengthened. Particularly, the complicated calculation process may act as a factor which makes the received signal difficult to be correctly compensated.

SUMMARY OF THE INVENTION

Therefore, it is an object of the present invention to provide an improved OFDM receiver using polar coordinates and a method thereof, which can simplify a structure in a system for frequency synchronization, a compensation for channel influence, and removal of remaining phase error, and reduce a time required in each operation, thereby enabling the correct compensation.

The above object is accomplished by a OFDM receiver which includes: an A/D converter for converting an input analog signal into a digital signal, a first converter for converting the digital signal, input from the A/D converter, into a polar coordinate system, and a synchronizer for compensating a frequency offset of the digital signal input from the first converter.

It is preferable that the synchronizer includes: a frequency offset estimator for estimating the frequency offset from the phases of a plurality of phase estimation signals and converting the estimated frequency offset into a phase value, and a frequency offset corrector for compensating a frequency offset of the digital signal input from the first converter according to the estimated frequency offset. Moreover, the OFDM receiver includes a memory for storing a lookup table in which a phase for each frequency offset is recorded, and the frequency offset estimator reads out a phase corresponding to the estimated frequency offset from the lookup table to convert it into the phase read out.

In addition, the OFDM receiver includes: a second converter for converting the digital signal compensated the frequency offset in an orthogonal coordinate system, a FFT for carrying out a fast fourier transform on the digital signal input from the second converter, an equalizer for compensating a channel distortion of the digital signal input from the FFT, and a phase compensator for compensating a phase error remaining in the digital signal input from the equalizer. It is preferable that the OFDM receiver has a third converter for converting the digital signal, input from the FFT, into the polar coordinate system and outputting the converted digital signal to the equalizer. Also, the OFDM receiver has a fourth converter for converting the digital signal input from the phase compensator into the orthogonal coordinate system.

The equalizer includes: a channel distortion estimator for estimating a channel distortion value from magnitudes and phases of the digital signal input from the FFT and outputting the estimated channel distortion value in magnitude and phase, and a channel distortion corrector for compensating a channel distortion of the digital signal input in the polar coordinate system according to the estimated channel distortion value. Moreover the OFDM receiver has a memory for storing a lookup table in which a phase for each channel distortion value is recorded, and the channel distortion estimator reads out a phase corresponding to the estimated channel distortion value from the lookup table to convert it into the phase read out. The channel distortion corrector includes: a channel distortion magnitude correcting portion for correcting a magnitude of the digital signal according to the channel distortion of the digital signal by multiplying the magnitude of the digital signal input in the polar coordinate system by the magnitude of the estimated channel distortion value, and a channel distortion phase correcting portion for correcting a phase of the digital signal according to the channel distortion of the digital signal by adding the phase of the estimated channel distortion value to the phase of the digital signal input in the polar coordinate system.

It is preferable that the phase compensator includes: a phase error estimator for estimating a phase error remaining in the digital signal by phases of a plurality of phase estimation signals, and a phase error corrector for compensating a phase error remaining in the digital signal input in the polar coordinate system according to the estimated phase error. In addition, the OFDM receiver has a memory for storing a lookup table in which a phase for each phase error is recorded, and the phase error estimator reads out a phase corresponding to the estimated phase error from the lookup table to convert it into a phase read out.

It is preferable that the OFDM receiver includes: a FFT for carrying out a fast fourier transform to a digital signal, a first converter for converting the digital signal, input from the FFT, in a polar coordinate system, an equalizer for compensating a channel distortion to the digital signal in the polar coordinate system, and a phase compensator for compensating a phase error remaining in the digital signal input from the equalizer. Moreover, the OFDM receiver has a second converter for converting the digital signal input from the phase compensator in an orthogonal coordinate system.

It is preferable that the equalizer includes: a channel distortion estimator for estimating a channel distortion value from magnitudes and phases of the digital signal and outputting the estimated channel distortion value in a magnitude and a phase, and a channel distortion corrector for compensating a channel distortion of the digital signal input in the polar coordinate system according to the estimated channel distortion value. In addition, the OFDM receiver has a memory for storing a lookup table in which a phase for each channel distortion value is recorded, and the channel distortion estimator reads out a phase corresponding to the estimated channel distortion value from the lookup table to convert it into the phase read out.

It is preferable that the channel distortion corrector includes: a channel distortion magnitude correcting portion for correcting a magnitude of the digital signal according to the channel distortion of the digital signal by multiplying the magnitude of the digital signal input in the polar coordinate system by the magnitude of the estimated channel distortion value, and a channel distortion phase correcting portion for correcting a phase of the digital signal according to the channel distortion of the digital signal by adding the phase of the estimated channel distortion value to the phase of the digital signal input in the polar coordinate system. Moreover, the phase compensator has a phase error estimator for estimating a phase error remaining in the digital signal by phases of a plurality of phase estimation signals, and a phase error corrector for compensating a phase error remaining in the digital signal input in the polar coordinate system according to the estimated phase error. Moreover, the OFDM receiver has a memory for storing a lookup table in which a phase for each phase error is recorded, and the phase error estimator reads out a phase corresponding to the estimated phase error from the lookup table to convert it into a phase read out.

On the other hand, a OFDM receiving method according to the present invention includes the steps of: converting a received analog signal into a digital signal, converting the digital signal from an orthogonal coordinate system to a polar coordinate system, compensating a frequency offset of the digital signal having the polar coordinate system, converting the digital signal, in which the frequency offset is compensated, from the polar coordinate system to the orthogonal coordinate system, carrying out a fourier transform to the digital signal, and correcting a signal error remaining in the digital signal.

The compensating step comprises the sub-steps of: (a) receiving estimation signals to estimate a frequency offset, (b) converting the estimated frequency offset into a phase, and (c) correcting a frequency offset of the digital signal by adding the frequency offset converted into a phase to a phase of the digital signal having the polar coordinate system. The step (b) reads out a phase corresponding to the estimated frequency offset from a lookup table in which a phase for each frequency offset is recorded, and converts the estimated frequency offset into a phase. Moreover, the OFDM receiving method has the steps of: converting the digital signal from the orthogonal coordinate system to the polar coordinate system after carrying out the fourier transform, compensating a channel distortion to the digital signal in the polar coordinate system, and compensating a phase error remaining in the digital signal in the polar coordinate system.

It is preferable that the OFDM receiving method according to the present invention includes the steps of: carrying out a fourier transform to a digital signal in an orthogonal coordinate system, converting the digital signal into a polar coordinates system, compensating a channel distortion to the digital signal in the polar coordinate system, and compensating a phase error remaining in the digital signal in the polar coordinate system.

BRIEF DESCRIPTION OF THE DRAWINGS

The foregoing and other objects, features and advantages of the invention will be apparent from the more particular description of the preferred embodiment of the invention, as illustrated in the accompanying drawings in which like reference characters refer to the same parts throughout the different views.

DETAILED DESCRIPTION OF PREFERRED EMBODIMENTS

The present invention now will be described in detail hereinafter with reference to the accompanying drawings, in which a preferred embodiment of the invention is shown. Like numbers refer to like elements throughout.

Figure 1:
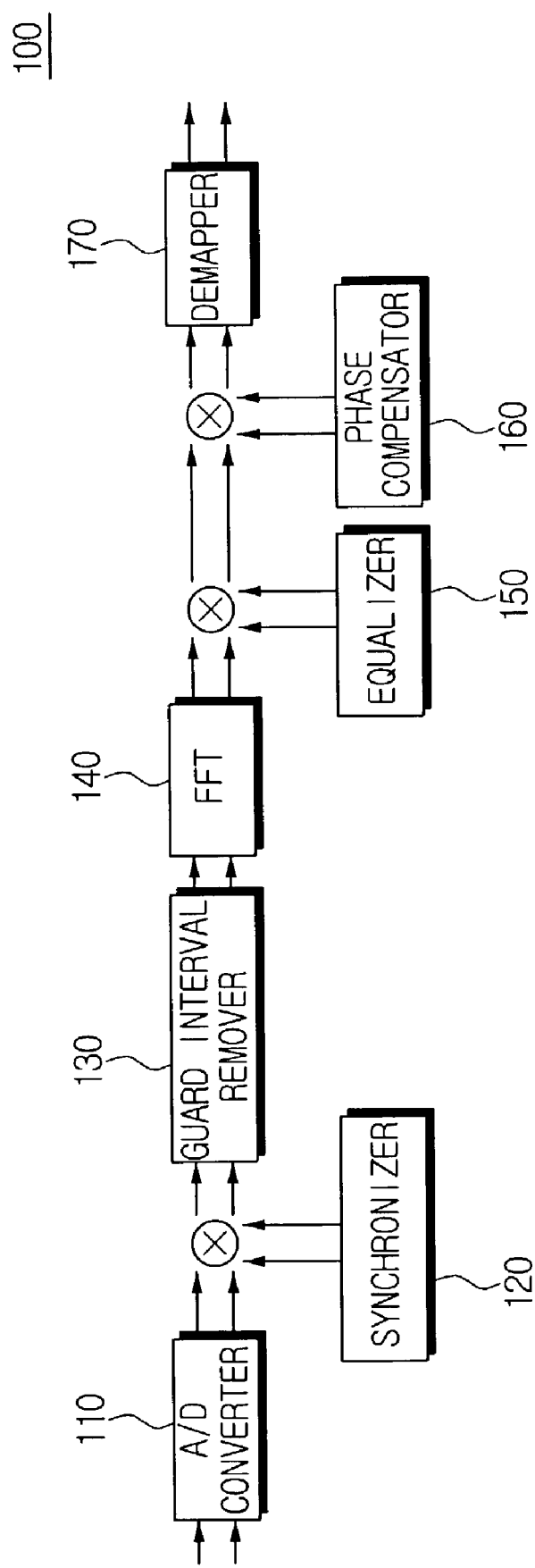
FIG. 1 is a block diagram of a conventional OFDM receiver.
Figure 2:
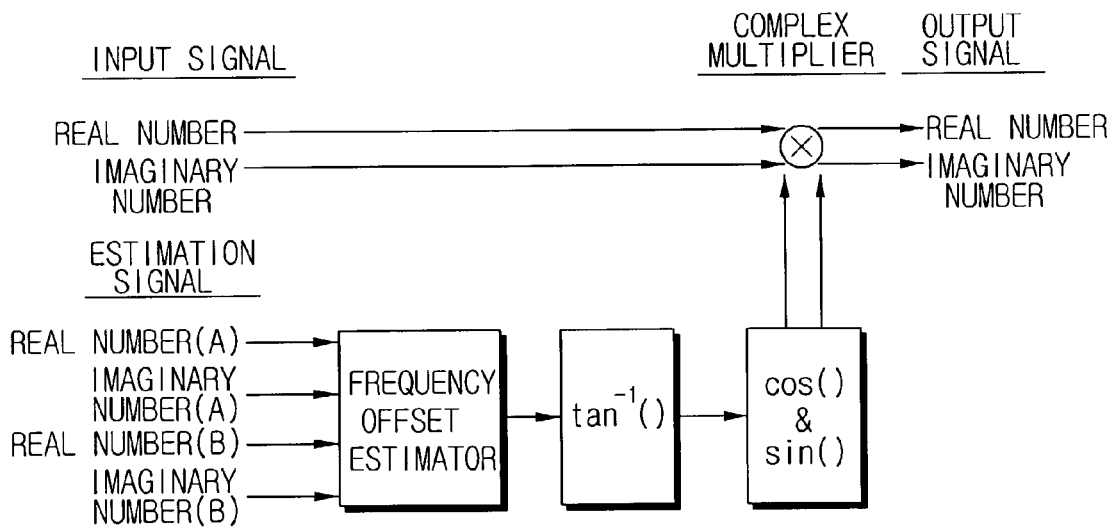
FIG. 2 is a block diagram of a synchronizer using orthogonal coordinates, which is used in the conventional OFDM receiver.
Figure 3:
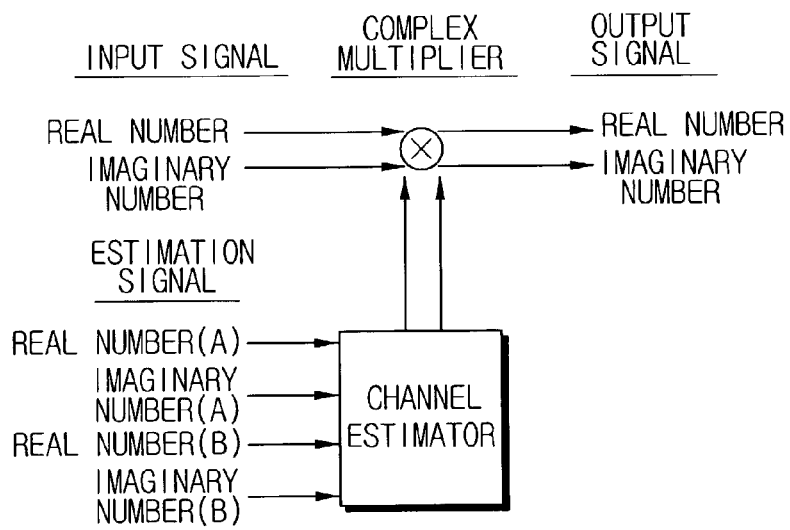
FIG. 3 is a block diagram of an equalizer using the orthogonal coordinates, which is used in the conventional OFDM receiver
Figure 4:
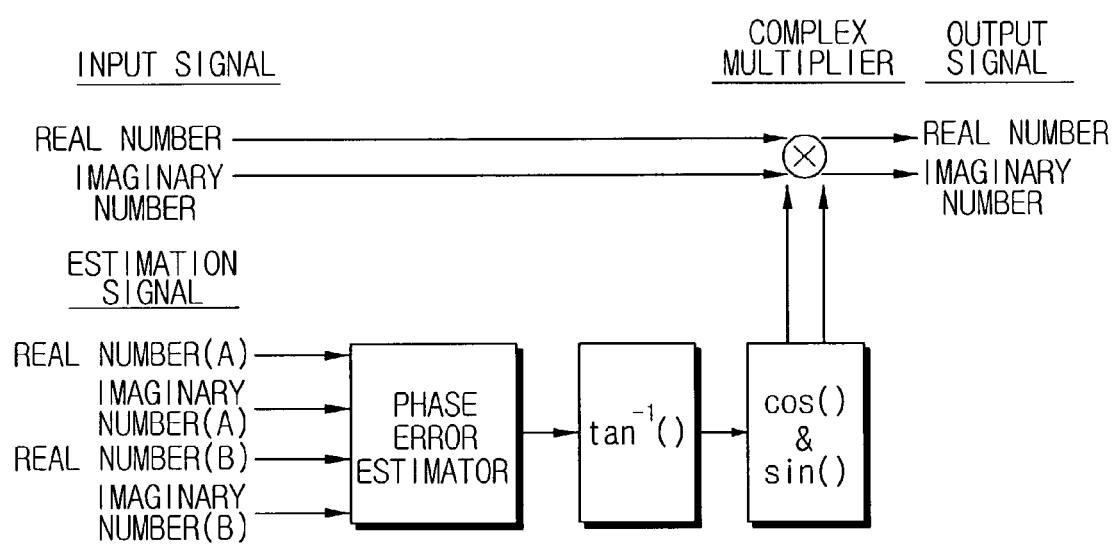
FIG. 4 is a block diagram of a phase compensator using the orthogonal coordinates, which is used in the conventional OFDM receiver.
Figure 5:
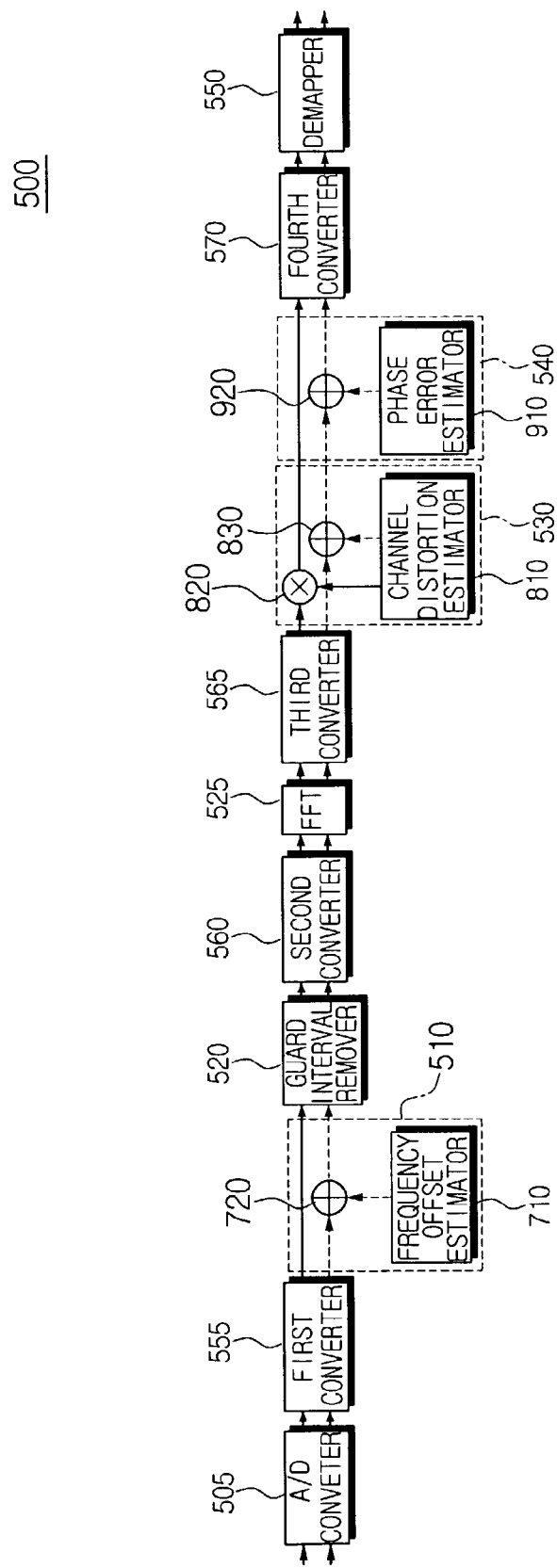
FIG. 5 is a block diagram of an OFDM receiver in accordance with a preferred embodiment of the present invention.

FIG. 5 is a block diagram for illustrating an OFDM receiver using polar coordinates in accordance with the present invention. In FIG. 5, real and imaginary number portions in a signal having an orthogonal coordinate system are represented as solid lines and a magnitude and a phase in a signal having a polar coordinate system are represented as a solid line and a dotted line, respectively.

Referring to FIG. 5, the OFDM receiver 500 in accordance with the present invention comprises an A/D converter 505, a synchronizer 510, a guard interval remover 520, a FFT 525, an equalizer 530, a phase compensator 540, a demapper 550, a first converter 555, a second converter 560, a third converter 565, and a fourth converter 570.

The A/D converter 505 converts an analog signal input through an antenna (not shown) into a digital signal having the orthogonal coordinate system. The first converter 555 receives the digital signal from the A/D converter 505 and converts it into a polar coordinate system. The synchronizer 510 receives the digital signal converted into the polar coordinate system and compensates its frequency offset. The guard interval remover 520 removes a guard interval from the digital signal outputted from the synchronizer 510. The second converter 560 receives the digital signal in which the guard interval is removed and converts it from the polar coordinate system to the orthogonal coordinate system. The FFT 525 receives the digital signal converted into the orthogonal coordinate system and carries out a fast fourier transform.

The digital signal to which the fast fourier transform is carried out by the FFT 525 is converted from the orthogonal coordinate system to the polar coordinate system at the third converter 565. The equalizer 530 compensates a channel distortion of the digital signal converted into the polar coordinate system. The phase compensator 540 compensates a phase error remaining in the digital signal in which the channel distortion is compensated. At the fourth converter 570, the digital signal in which the phase error is compensated is converted from the polar coordinate system to the orthogonal coordinate system. The demapper 550 receives the digital signal in the orthogonal or polar coordinate system and converts it into the most approximate value among values of a mapping table.

Figure 6A:
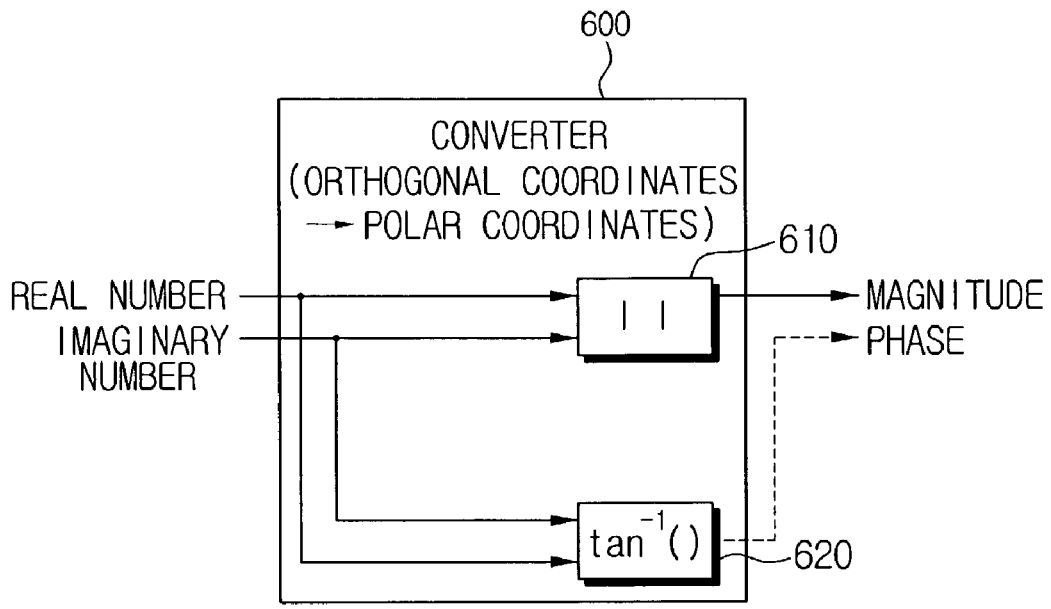
FIG. 6A and FIG. 6B are block diagrams of converters for converting a signal from the orthogonal coordinate system to a polar coordinate system and from the polar coordinate system to the orthogonal coordinate system, respectively.
Figure 6B:
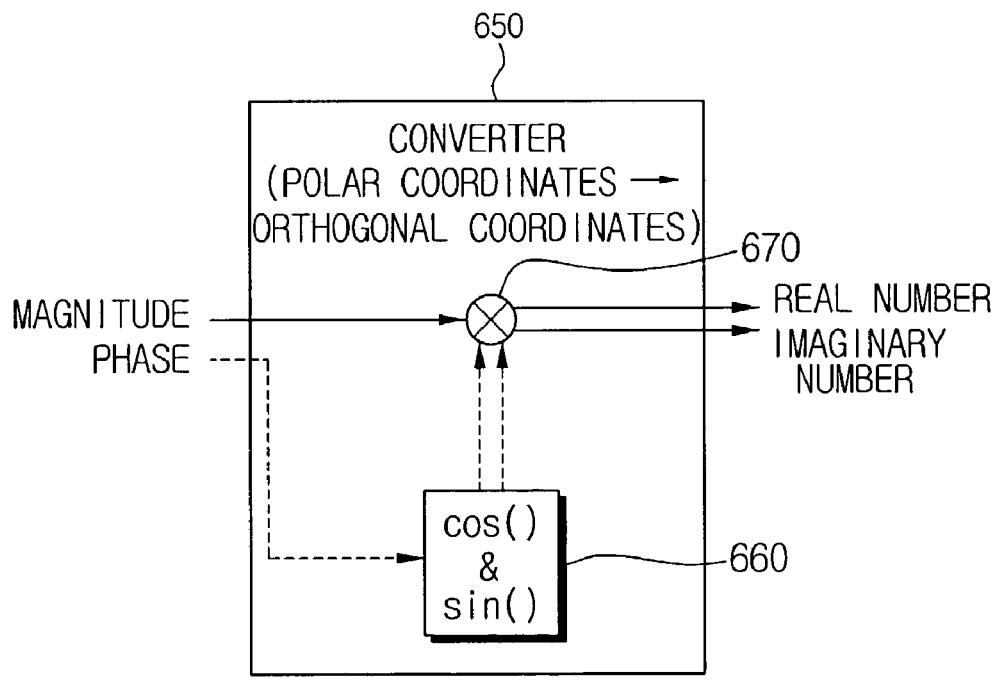

The first and third converters 555, 565 convert a signal from the orthogonal coordinate system to the polar coordinate system, whereas the second and fourth converters 560, 570 convert it from the polar coordinate system to the orthogonal coordinate system. In FIG. 6A and FIG. 6B, there are illustrated converters for converting the signal from the orthogonal coordinate system to the polar coordinate system and from the polar coordinate system to the orthogonal coordinate, respectively.

Referring to FIG. 6A, the converter for converting the signal from the orthogonal coordinate system to the polar coordinate system has a level portion 610 for receiving the signal of the orthogonal coordinate system having real and imaginary number portions and outputting a magnitude thereof, and a phase portion 620 for receiving the signal of the orthogonal coordinate system and outputting a phase thereof.

Referring to FIG. 6B, the converter for converting the signal from the polar coordinate system to the orthogonal coordinate system has a dividing portion 660 for receiving the signal of the polar coordinate system having a magnitude and a phase and outputting cosine and sine values for the phase, and a converting portion 670 for converting the signal into a signal of the orthogonal coordinate system having the real and imaginary number portions by multiplying the magnitude of the signal by the cosine and sine values outputted from the dividing portion 660.

Figure 7:
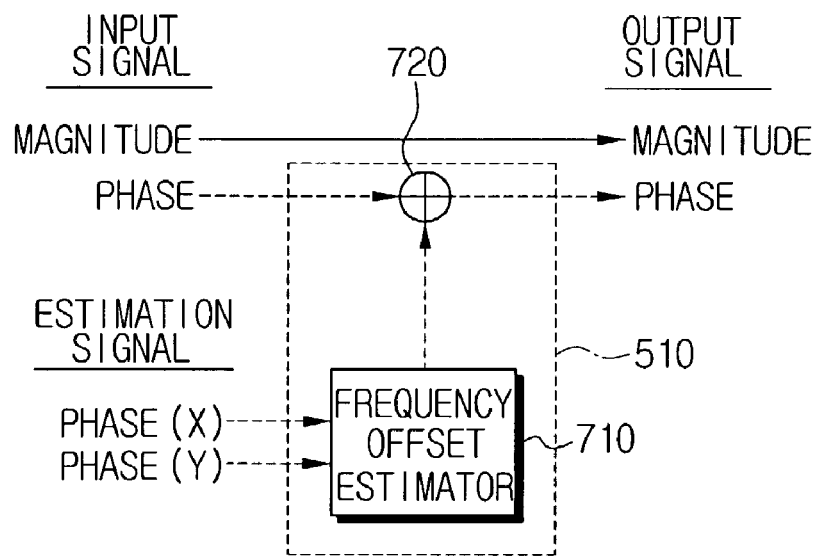
FIG. 7 is a block diagram of a synchronizer, which is applied to the OFDM receiver of the present invention.

In FIG. 7, there is illustrated a composition of the synchronizer 510, which is applied to the OFDM receiver 500 in accordance with the present invention.

Referring to FIG. 7, the synchronizer 510 has a frequency offset estimator 710 for receiving phases of a plurality of phase estimation signals, estimating a frequency offset which is generated by a difference in frequency of an RF carrier wave between a transmitter and a receiver, and converting an estimated frequency offset into a phase value to output it, and a frequency offset corrector 720 for compensating a frequency offset of the digital signal input from the first converter 555 according to the estimated frequency offset.

The frequency offset estimator 710 estimates a frequency offset from phase signals X, Y which are input to estimate the frequency offset. The process for estimating, the frequency offset is carried out by the following mathematical expression 4.

$$X^*Y = (A_x e^{j\Phi_X})^* A_Y e^{j\Phi_Y} = A_x e^{-j\Phi_X} A_Y e^{j\Phi_Y} = A_x A_Y e^{j(-\Phi_X + \Phi_Y)}$$ [Mathematical expression 4]

In the mathematical expression 4, supposing $\theta_b$ is $-\Phi_X + \Phi_Y$, the estimated frequency offset comes to $\theta_b$.

The estimated frequency offset is converted into a phase value and input to the frequency offset corrector 720. Alternatively, when the estimated frequency offset is converted into the phase value, a lookup table in which a phase value corresponding to each frequency offset is recorded can be used. In this case, the lookup table is stored in a memory, which is disposed in the OFDM receiver.

The frequency offset corrector 720 removes the frequency offset from the digital signal by adding the phase value input from the frequency offset estimator 710 to a phase of the digital signal input from the first converter 555. Supposing a phase of input digital signal is $\theta_z$, a phase of the signal in which a frequency offset is removed is determined by the following mathematical expression 5.

$$\theta = \theta_z - \theta_b$$ [Mathematical expression 5]

The phase of the signal in which the frequency offset is removed is input into the guard interval remover 520. The frequency offset corrector 720 can be formed of an adder. Also, a magnitude of the digital signal is input directly into the guard interval remover 520 from the first converter 555.

The digital signal having the polar coordinate system in which the frequency offset and the guard interval are removed is converted into the orthogonal coordinate system at the second converter 560, and then input into the FFT 525. Since the FFT 525 and the A/C converter 505 are operated in the orthogonal coordinate mode, the second converter 560 is disposed in front of the FFT 525 in order to convert the signal into the orthogonal coordinate system.

Figure 8:
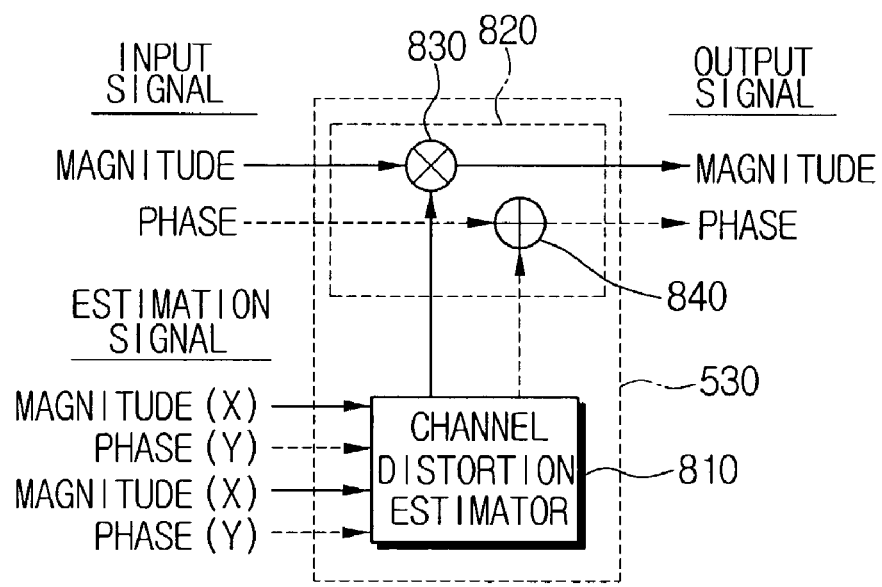
FIG. 8 is a block diagram of an equalizer, which is applied to the OFDM receiver of the present invention.

In FIG. 8, there is illustrated a composition of the equalizer 530, which is applied to the OFDM receiver 500 of the present invention.

Referring to FIG. 8, the equalizer 530 has a channel distortion estimator 810 for receiving magnitudes and phases in a plurality of channel estimation signals and representing an estimated channel distortion value as a magnitude and a phase to output it, and a channel distortion corrector 820 for compensating a channel distortion of the digital signal represented by the polar coordinate system, according to the estimated channel distortion value.

The channel distortion estimator 810 estimates a channel distortion value from estimation signals X and Y input to estimate the channel distortion. The magnitude and phase of each of estimation signals X and Y, which are represented in the polar coordinate system, are input into the channel distortion estimator 810. The channel distortion estimator 810 estimates a distortion due to the channel by using the input estimation signals X and Y, and converts the estimated channel distortion value into a magnitude and a phase to output them.

When the estimated channel distortion value is converted into the phase, a lookup table in which a phase value corresponding to each channel distortion value is recorded can be used. In this case, the lookup table can be stored in the memory, which is disposed in the OFDM receiver 500, or other storing device.

The channel distortion corrector 820 has a channel distortion magnitude correcting portion 830 for correcting a magnitude of the digital signal according to the channel distortion of the digital signal by multiplying the magnitude of the digital signal input in the polar coordinate system by the magnitude of the estimated channel distortion value, and a channel distortion phase correcting portion 840 for correcting a phase of the digital signal according to the channel distortion of the digital signal by adding the phase of the digital signal input in the polar coordinate system by the phase of the estimated channel distortion value.

The channel distortion magnitude correcting portion 830 can be formed of a multiplier and the channel distortion phase correcting portion 840 can be formed of an adder. The operation of the channel distortion phase correcting portion 840 will not be explained since it is similar to that of the frequency offset corrector 720 of the synchronizer 510 explained with reference to FIG. 7.

Figure 9:
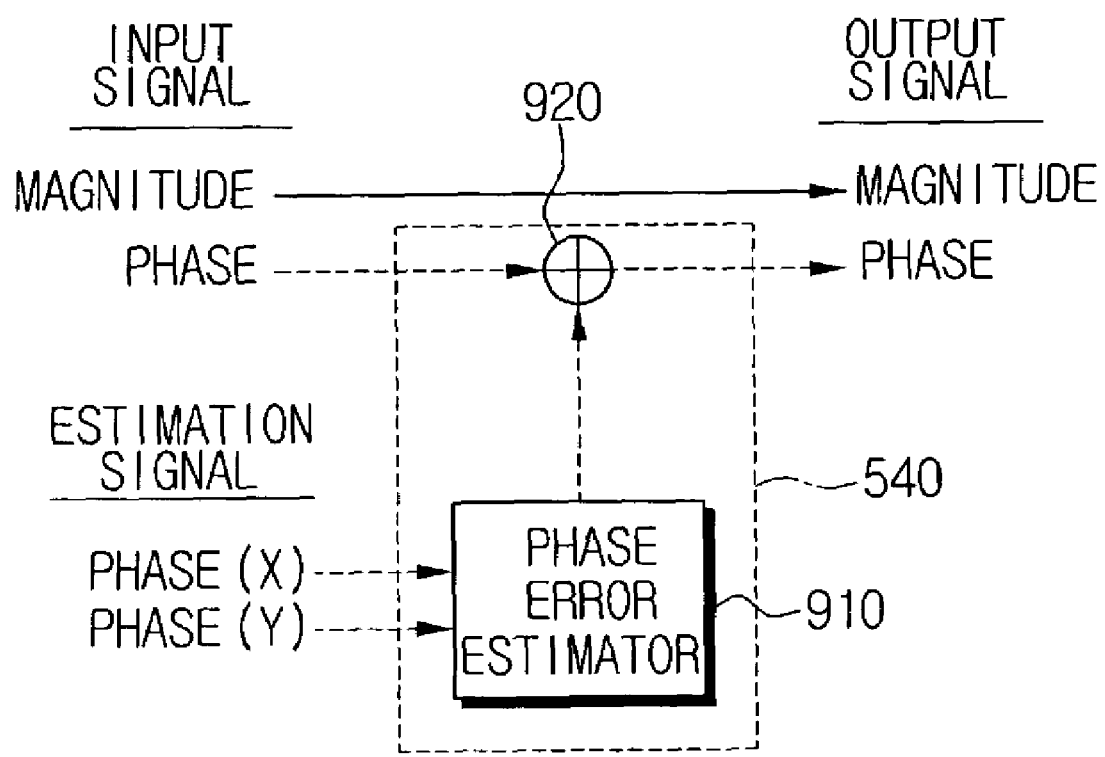
FIG. 9 is a block diagram of a phase compensator, which is applied to the OFDM receiver of the present invention.

In FIG. 9, there is illustrated a composition of the phase compensator 540, which is applied to the OFDM receiver 500 in accordance with the present invention.

The phase compensator 540 corrects a phase error remaining in the digital signal in which the frequency offset is removed and the distortion due to the channel is corrected. The operation of the phase compensator 540 will not be explained since it is similar to that of the frequency offset corrector 720 of the synchronizer 510 explained with reference to FIG. 7. In FIG. 9, a phase error estimator 910 and a phase error corrector 920 carry out respectively functions similar to the frequency offset estimator 710 and the frequency offset corrector 720 illustrated in FIG. 7.

When estimated phase error is converted into a phase value at the phase compensator 540, a lookup table in which a phase value corresponding to each phase error is recorded can be used. In this case, the lookup table can be stored in the memory, which is disposed in the OFDM receiver 500, or other storing device.

Also, when the analog signal input from the A/D converter 510 is a signal mapped by one among a M-ary phase shift keying (PSK) modulation and an amplitude phase shift keying (APSK) modulation, it is not necessary for the OFDM receiver 500 of the present invention 500 to have the fourth converter 570 for converting the signal from the polar coordinate system to the orthogonal coordinate system, since a demapping table has magnitude and phase information on the signal.

Alternatively, the synchronizer 510, the equalizer 530, and the phase compensator 540 explained with reference to FIG. 7 through FIG. 9 can be fabricated respectively as separate devices which are used in the conventional OFDM receiver. In this case, the synchronizer, the equalizer, and the phase compensator should have converters for converting a signal from the orthogonal coordinate system to the polar coordinate system or/and from the polar coordinate system the orthogonal coordinate system, respectively. The operation of the synchronizer, the equalizer, and the phase compensator fabricated as separate devices and an OFDM receiver using them will not be explained since it is the same as that described above.

Figure 10:
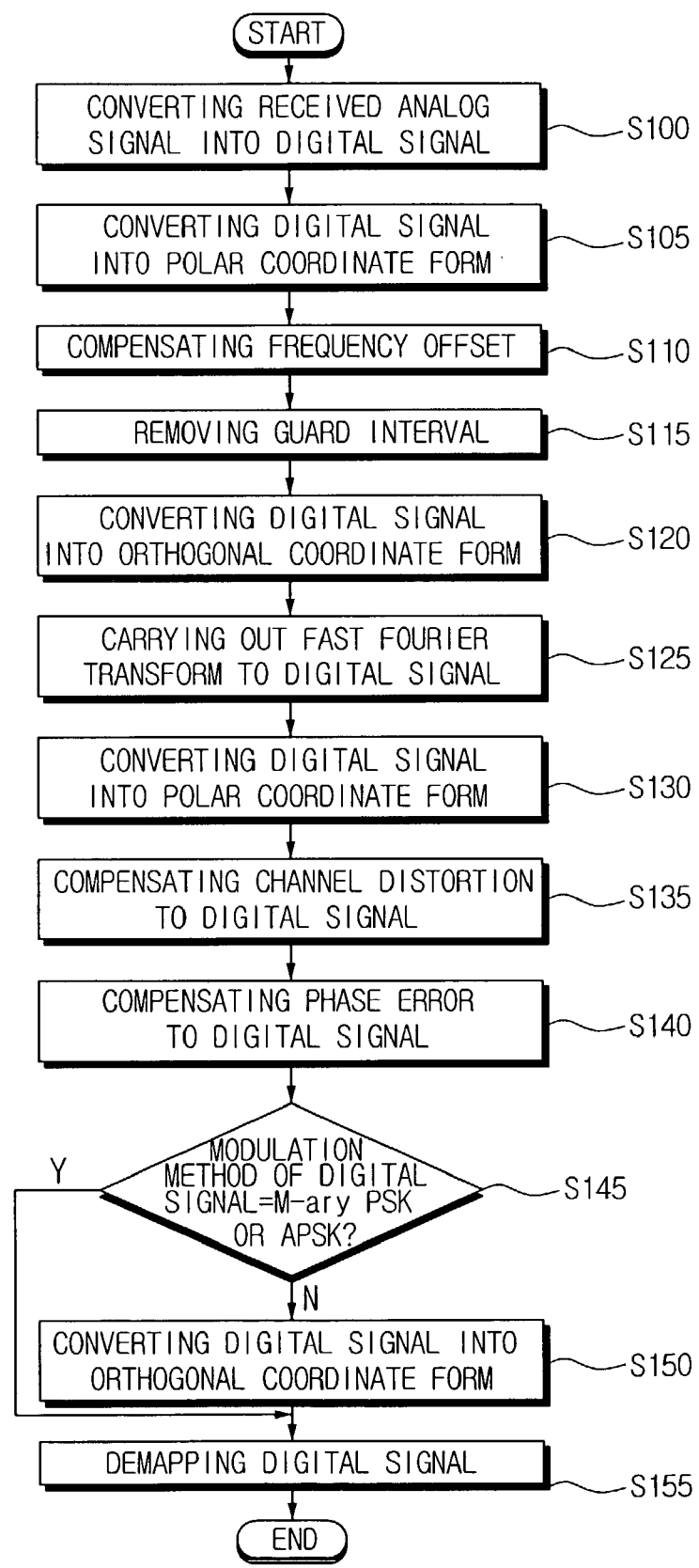
FIG. 10 is a flowchart illustrating an OFDM receiving method in accordance with the present invention.

FIG. 10 is a flowchart for illustrating an OFDM receiving method in accordance with the present invention.

Referring to FIG. 10, an A/D converter 505 converts an input analog signal into a digital signal (S100). The signal converted into the digital signal is converted into a polar coordinate system at a first converter 555 (S105). A frequency offset in the signal converted into the polar coordinate system is compensated at a synchronizer 510 (S110). The S110 step includes receiving phases of a plurality of estimation signals, estimating a frequency offset from them, and converting estimated frequency offset into a phase to output it, and compensating a frequency offset of the signal by adding the phase corresponding to the estimated frequency offset to a phase of the signal. Alternatively, when the estimated frequency offset is converted into the phase, the phase corresponding to the estimated frequency offset can be obtained from a lookup table in which a phase for each frequency offset is recorded.

A guard interval remover 520 removes a guard interval from the signal in which the frequency offset is compensated (S115). The signal in which the guard interval is removed is converted into an orthogonal coordinate system (S120) and input into a FFT 525. The FFT 525 carries out a fast fourier transform on the signal (S125). The signal on which the fast fourier transform is carried out is converted into the polar coordinate system at a third converter 565 (S130).

An equalizer 530 compensates a distortion due to the influence of channel in the signal converted into the polar coordinate system (S135). The S135 step includes receiving estimation signals, estimating a channel distortion value from them, and converting estimated channel distortion value into a magnitude and a phase, and compensating a channel distortion to the signal by multiplying a phase of the signal having the polar coordinate system by the magnitude for the estimated channel distortion value and adding the phase for the estimated channel distortion value to the phase of the signal having the polar coordinate system. Alternatively, when the estimated channel distortion value is converted into the phase, the phase corresponding to the estimated channel distortion value can be read from the lookup table in which a phase for each channel distortion value is recorded.

A phase compensator 540 compensates a phase error remaining in the signal converted into the orthogonal coordinate system (S140). The S140 step includes receiving estimation signals, estimating a phase error, and converting estimated phase error into a phase, and compensating a phase error remaining in the signal by adding the phase error converted into the phase to the phase of the signal having the polar coordinate system. In this case, when the estimated phase error is converted into the phase, the phase corresponding to the estimated phase error can also be read from the lookup table in which a phase for each phase error is recorded.

After the steps for compensating the channel distortion and/or the phase error are carried out, the OFDM receiver 500 confirms whether the signal is modulated by a M-ary PSK method or an APSK method (S145). When the signal is not modulated by the M-ary PSK method or the APSK method, the signal is converted into the orthogonal coordinate system at a fourth converter 570 and then input into a demapper 550 (S150). However, when the signal is modulated by the M-ary PSK method or the APSK method, the signal is input into the demapper 550 in the polar coordinate system without being converted into the orthogonal coordinate system. The demapper 550 converts the signal into the most approximate value in a mapping table, which is used in the OFDM receiver 500.

As is apparent from the foregoing description, it can be appreciated that the OFDM receiver using polar coordinates and method thereof of the present invention can reduce the number of adders and multipliers required in the frequency synchronization, the compensation for channel influence, and the removal of remaining phase error as well as the time required in the signal compensation and the like by processing the signal in the polar coordinate system, thereby simplifying the receiver structure and the calculation process. In the following table 1, calculation times when a received signal was processed in the polar coordinate system in the OFDM receiver were compared with those when it was processed in the orthogonal coordinate system therein.

TABLE 1

|  | A signal of the orthogonal coordinate system | A signal of the polar coordinate system |
| --- | --- | --- |
| The coordinate converter |  | Complex multiplication: 0–4 times Arctangent, sine, and cosine functions: each 2 times |
| The synchronizer | Complex multiplication: 2 times Division: 1 time Arctangent, sine, and cosine functions: each 1 time | Addition: 2 times |
| The equalizer | Complex multiplication: 2 times Division: 1 time | Multiplication: 1–2 times Addition: 1–2 times Division: 1 time |
| The phase compensator | Complex multiplication: 2 times Division: 1 time Arctangent, sine and cosine functions: each 1 time | Addition: 2 times |
| Total | Complex multiplication: 5–6 times (=multiplication: 20–24 times and addition: 10–12 times) Arctangent, sine and cosine functions: each 2 times Division: 3 times | Complex multiplication: 0–4 times, multiplication: 1–2 times, and addition: 5–6 times (=multiplication: 1–18 times and addition: 5–14 times) Arctangent, sine and cosine functions: each 2 times Division: 1 time |

Also, since in the polar coordinates, a complex multiplication process which is to be essentially carried out in the orthogonal coordinates is changed into an addition process for phase components, the transmission or generation of quantization noise components due to increase in magnitude of output bits can be evidently decreased. In the following table 2, an increase in magnitude of output bits for a signal of the polar coordinate system was compared with that for signal of the orthogonal coordinate system.

TABLE 2

|  | A signal of the orthogonal coordinate system | A signal of the polar coordinate system |
|---|---|---|
| An input in the complex multiplication | A real number portion ($X_r$: n[bits]) An imaginary number portion ($X_i$: n[bits]) | A magnitude ($A_x$: n[bits]) A phase ($\Phi_x$: n[bits]) |
| An output in the complex multiplication | (2n + 1) [bits] | (n + 1)[bits] |

In the drawings and specification, there have been disclosed a typical preferred embodiment of the invention and, although specific terms are employed, they are used in a generic and descriptive sense only and not for purpose of limitation, the scope of the invention being set forth in the following claims.

What is claimed is:

1. An orthogonal frequency division multiplexing (OFDM) receiver comprising:
   an A/D converter for converting an input analog signal into a digital signal;
   a first converter for converting the digital signal input from the A/D converter into a polar coordinate system;
   a synchronizer for compensating a frequency offset of the digital signal input from the first converter;
   a second converter for converting the digital signal input from the synchronizer into an orthogonal coordinate system;
   a FFT for carrying out a fast fourier transform on the digital signal input from the second converter;
   an equalizer for compensating a channel distortion of the digital signal input from the FFT; and
   a phase compensator for compensating a phase error remaining in the digital signal input from the equalizer.

2. The OFDM receiver according to claim 1, wherein the synchronizer comprises:
   a frequency offset estimator for estimating the frequency offset from the phases of a plurality of phase estimation signals and converting the estimated frequency offset into a phase value; and
   a frequency offset corrector for compensating a frequency offset of the digital signal input from the first converter according to the estimated frequency offset.

3. The OFDM receiver according to claim 2, further comprising a memory for storing a lookup table in which a phase for each frequency offset is recorded,
   wherein the frequency offset estimator reads out a phase corresponding to the estimated frequency offset from the lookup table to convert it into the phase read out.

4. The OFDM receiver according to claim 1, further comprising:
   a guard interval remover for removing a guard interval from the digital signal input from the synchronizer.

5. The OFDM receiver according to claim 4, further comprising a third converter for converting the digital signal input from the FFT into the polar coordinate system and outputting the converted digital signal to the equalizer.

6. The OFDM receiver according to claim 5, further comprising a fourth converter for converting the digital signal input from the phase compensator into the orthogonal coordinate system.

7. The OFDM receiver according to claim 5, wherein the equalizer comprises:
   a channel distortion estimator for estimating a channel distortion value from magnitudes and phases of the digital signal input from the FFT and outputting the estimated channel distortion value in a magnitude and a phase; and
   a channel distortion corrector for compensating a channel distortion of the digital signal input in the polar coordinate system according to the estimated channel distortion value.

8. The OFDM receiver according to claim 7, further comprising a memory for storing a lookup table in which a phase for each channel distortion value is recorded,
   wherein the channel distortion estimator reads out a phase corresponding to the estimated channel distortion value from the lookup table to convert it into the phase read out.

9. The OFDM receiver according to claim 7, wherein the channel distortion corrector comprises:
   a channel distortion magnitude correcting portion for correcting a magnitude of the digital signal according to the channel distortion of the digital signal by multiplying the magnitude of the digital signal input in the polar coordinate system by the magnitude of the estimated channel distortion value; and
   a channel distortion phase correcting portion for correcting a phase of the digital signal according to the channel distortion of the digital signal by adding the phase of the estimated channel distortion value to the phase of the digital signal input in the polar coordinate system.

10. The OFDM receiver according to claim 5, wherein the phase compensator comprises:
    a phase error estimator for estimating a phase error remaining in the digital signal by phases of a plurality of phase estimation signals; and
    a phase error corrector for compensating a phase error remaining in the digital signal input in the polar coordinate system according to the estimated phase error.

11. The OFDM receiver according to claim 10, further comprising a memory for storing a lookup table in which a phase for each phase error is recorded,
    wherein the phase error estimator reads out a phase corresponding to the estimated phase error from the lookup table to convert it into a phase read out.

12. An OFDM receiver comprising:
    a FFT for carrying out a fast fourier transform on a digital signal;
    a first converter for converting the digital signal input from the FFT into a polar coordinate system;
    an equalizer for compensating a channel distortion to the digital signal in the polar coordinate system; and
    a phase compensator for compensating a phase error remaining in the digital signal input from the equalizer.

13. The OFDM receiver according to claim 12, further comprising a second converter for converting the digital signal input from the phase compensator into an orthogonal coordinate system.

14. The OFDM receiver according to claim 12, wherein the equalizer comprises:
    a channel distortion estimator for estimating a channel distortion value from magnitudes and phases of the digital signal and outputting the estimated channel distortion value in a magnitude and a phase; and a channel distortion corrector for compensating a channel distortion of the digital signal input in the polar coordinate system according to the estimated channel distortion value.

15. The OFDM receiver according to claim 14, further comprising a memory for storing a lookup table in which a phase for each channel distortion value is recorded, wherein the channel distortion estimator reads out a phase corresponding to the estimated channel distortion value from the lookup table to convert it into the phase read out.

16. The OFDM receiver according to claim 14, wherein the channel distortion corrector comprises:

a channel distortion magnitude correcting portion for correcting a magnitude of the digital signal according to the channel distortion of the digital signal by multiplying the magnitude of the digital signal input in the polar coordinate system by the magnitude of the estimated channel distortion value; and a channel distortion phase correcting portion for correcting a phase of the digital signal according to the channel distortion of the digital signal by adding the phase of the estimated channel distortion value to the phase of the digital signal input in the polar coordinate system.

17. The OFDM receiver according to claim 12, wherein the phase compensator comprises:

a phase error estimator for estimating a phase error remaining in the digital signal by phases of a plurality of phase estimation signals; and a phase error corrector for compensating a phase error remaining in the digital signal input in the polar coordinate system according to the estimated phase error.

18. The OFDM receiver according to claim 17, further comprising a memory for storing a lookup table in which a phase for each phase error is recorded, wherein the phase error estimator reads out a phase corresponding to the estimated phase error from the lookup table to convert it into a phase read out.

19. An OFDM receiving method, comprising the steps of:
converting a received analog signal into a digital signal;
converting the digital signal from an orthogonal coordinate system to a polar coordinate system;
compensating a frequency offset of the digital signal having the polar coordinate system;
converting the digital signal, in which the frequency offset is compensated, from the polar coordinate system to the orthogonal coordinate system;
carrying out a fourier transform to the digital signal converted to the orthogonal system; and
correcting a signal error remaining in the fourier transformed digital signal.

20. The OFDM receiving method according to claim 19, wherein the compensating step comprises the sub-steps of:

(a) receiving estimation signals to estimate a frequency offset;

(b) converting the estimated frequency offset into a phase; and (c) correcting a frequency offset of the digital signal by adding the frequency offset converted into a phase to a phase of the digital signal having the polar coordinate system.

21. The OFDM receiving method according to claim 20, wherein the step (b) reads out a phase corresponding to the estimated frequency offset from a lookup table in which a phase for each frequency offset is recorded, and converts the estimated frequency offset into a phase.

22. The OFDM receiving method according to claim 19, further comprising the steps of:

converting the digital signal from the orthogonal coordinate system to the polar coordinate system after carrying out the fourier transform;

compensating a channel distortion of the digital signal in the polar coordinate system; and compensating a phase error remaining in the digital signal in the polar coordinate system.

23. An OFDM receiving method, comprising the steps of:
carrying out a fourier transform on a digital signal in an orthogonal coordinate system;
converting the fourier transformed digital signal into a polar coordinates system;
compensating a channel distortion of the digital signal in the polar coordinate system; and
compensating a phase error remaining in the digital signal in the polar coordinate system.

* * * * *